United States Patent [19]

Dudley

[11] Patent Number: 4,741,610

[45] Date of Patent: May 3, 1988

[54] OBLIQUE COMPOUND PARABOLIC REFLECTOR

[76] Inventor: Eric Dudley, 8 Victoria Road, Sidcup Kent, United Kingdom, DA15 7HD

[21] Appl. No.: 938,393

[22] Filed: Dec. 5, 1986

[51] Int. Cl.$^4$ .................. G02B 17/06; F24J 2/14; F24J 2/18

[52] U.S. Cl. ................... 350/619; 126/439; 343/912

[58] Field of Search ............... 350/619; 353/3; 126/438, 439; 343/912, 914, 915

[56] References Cited

U.S. PATENT DOCUMENTS

| | | | |
|---|---|---|---|
| 2,182,222 | 12/1939 | Courtis et al. | 126/438 |
| 2,540,417 | 2/1951 | Bergmans et al. | 350/619 |
| 3,118,437 | 1/1984 | Hunt | 350/619 |
| 4,038,972 | 8/1977 | Orrison | 126/439 |
| 4,439,020 | 3/1984 | Maruko | 353/3 |
| 4,549,528 | 10/1985 | Gibson | 126/438 |

FOREIGN PATENT DOCUMENTS 2148525  5/1985  United Kingdom ............ 350/619

Primary Examiner—Jon W. Henry

[57] ABSTRACT

A device to focus to a point parallel electro-magnetic or sound waves, eg a solar power station, that consists of a reflector curved in one direction to a parabola, that reflects incoming waves onto a second reflector which is also curved in one diection to a parabola. The two reflectors are so placed so as to concentrate the incoming parallel waves to a point focus. The second reflector, unlike similar devices, is so mounted that its focal line makes an acute angle to the plane of symmetry of the first reflector. The device may be mounted on a mechanism to allow the device to track the source of energy, eg in the case of a solar power station the sun. The device can be mounted so that as it tracks the source of energy the focal point remains stationary. The operation of the device can be reversed to create outgoing parallel waves of energy from a point source.

7 Claims, No Drawings

OBLIQUE COMPOUND PARABOLIC REFLECTOR

BACKGROUND TO THE INVENTION

1. Field of the Invention

The device is relevant to a number of fields including solar power, telecommunictions, radar, lighting, radio astronomy, sound recording and emmission.

2. Description of the Prior Art

It is intended that the device performs tasks requiring a point focus currently achieved using a paraboloid reflector. Paraboloid reflectors, having three-dimensional curvatures, are difficult to construct accurately and with a satisfactory reflective surface, and are thus expensive.

The present invention is very similar to that covered in UK patent GB No. 2148525 B (Dudley), however in that invention the second reflector faces in a direction normal to the incoming rays.

SUMMARY OF THE INVENTION

According to the present invention there is provided a means of concentrating parallel waves of energy, such as solar energy to a point focus, which consists of two reflectors, each of which is part of a parabolic cylinder, the first reflector reflecting the waves onto the second reflector whose focal length is not greater than the first reflectors, and which is positioned so that its plane of symmetry is perpendicular to both the plane of symmetry and the focal line of the first reflector, so that the second reflector is equidistant from the second reflectors focal line and the plane parallel to the second reflectors focal line that contains the first reflectors focal line, and so that the second reflectors focal line makes an acute angle to the plane of symmetry of the first reflector.

A reflector as described above can be used in reverse to produce parallel waves from a point source of energy, the point source being placed at the focus.

The geometry of the invention can be described as follows:

1. In FIG. 1 ABCD is the plane of symmetry of the first reflector, a parabolic cylinder that includes ABMKL. CD is the focal line of the first reflector.

2. The second reflector, also a parabolic cylinder, PGQRNS, is defined as the locus of the points equidistant from a line EF, and a plane CDZW that includes the focal line, CD, of the first reflector. The plane EFG is the plane of symmetry of the second reflector.

3. Consider a plane of incoming parallel light that is perpendicular to the plane of symmetry of the first reflector, such as the plane BCWNRQLMXY. Consider particularly the light in this plane that strikes the segment of the first reflector between L and M.

4. This light is reflected in the same plane towards a point focus on the focal line, CD, of the first reflector at point C. This light is intercepted by the secondary reflector, PQRNS, along the line QRN. This line is straight and, by definition in 2 above, is parallel to and equidistant from EF and the plane CDWZ.

5. The light is thus reflected from QR, as if from a plane mirror, along the plane FQRN, the light coming to a focus at a point the same distance from QRN as N is from CW. Also as with a plane mirror, the new focus will lie in the plane that is perpendicular to NRQ and which includes point C, that is the plane CDSNF. Thus the new focus will lie along the intersection of CDSNF and FQRN, that is the line NF.

6. By definition, in 2 above, CN=NF, thus the new reflected focus is at F.

7. The above arguements apply to all planes of light parallel to BCWNRQMLXY with the light travelling parallel to the plane of symmetry, ABCD, of the first reflector. Thus all such light reflected by the two reflectors will pass through point F thus giving a true point focus at F.

8. Note, the primary reflector, ABMLX, is defined as the locus of points equidistant from CD and a plane perpendicular to the plane ABCD. The total distance travelled by the light to the focus F is identical to that which it would have travelled if uninterrupted to the said plane. This signifies that the light will reach the focus F in phase.

DESCRIPTION OF THE PREFERRED EMBODIMENTS

Three embodiments of the invention will now be described by way of examples of the posible range of applications.

First Embodiment, a Solar Power Station

Figure 1:
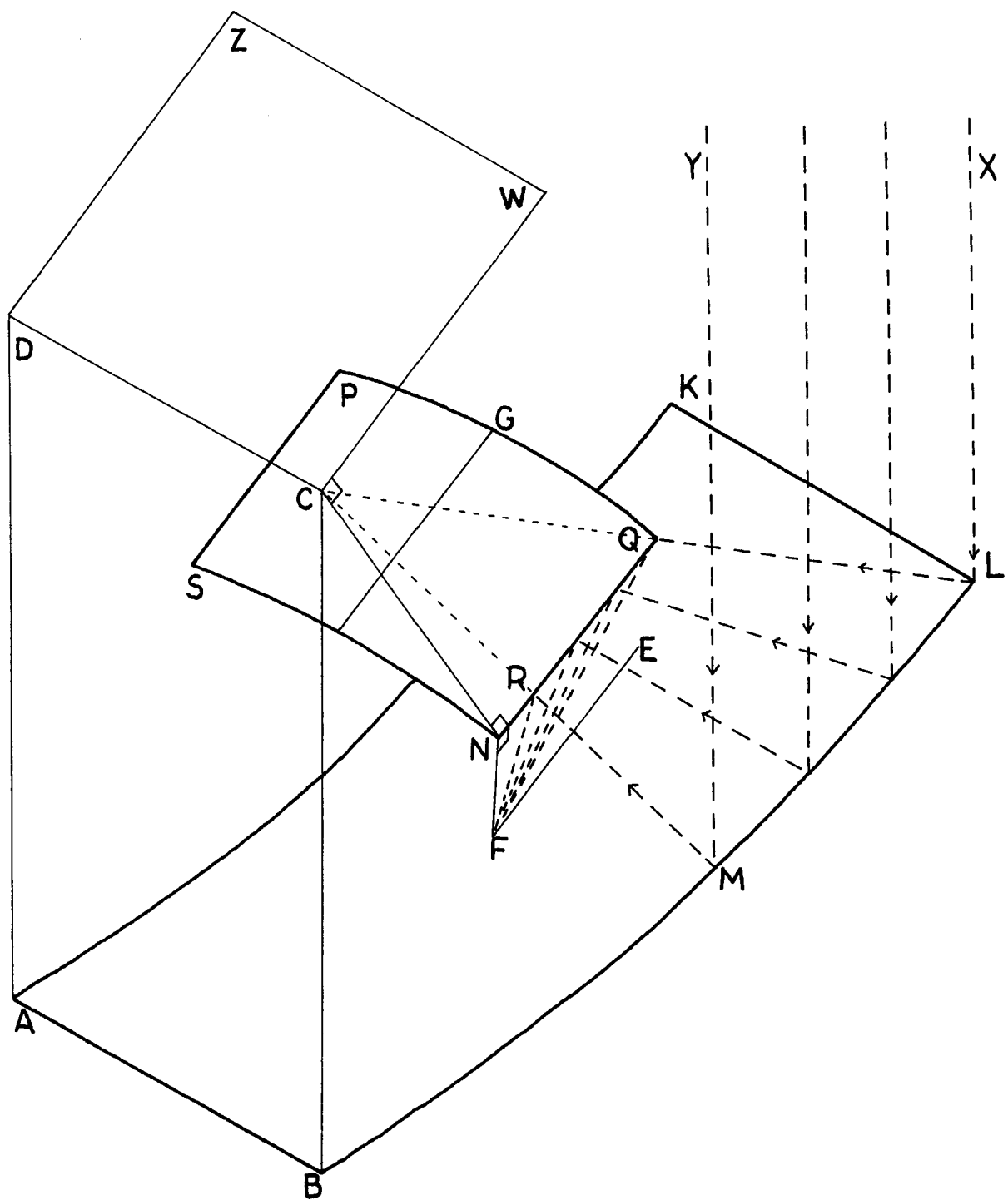
FIG. 1 shows the geometry of the present invention.
Figure 2:
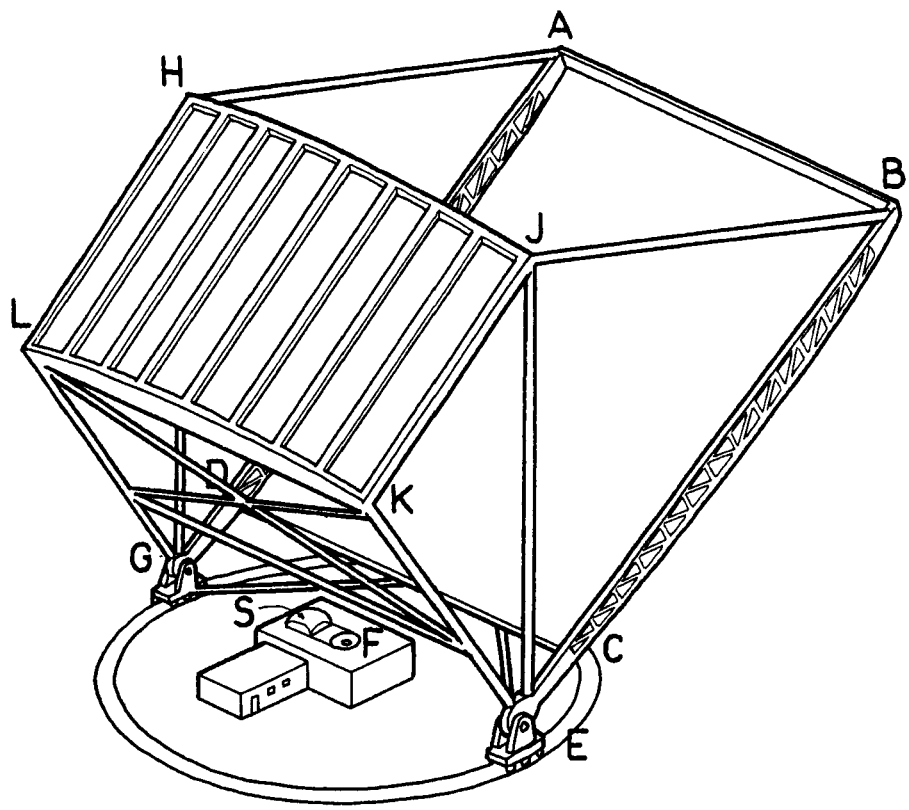
FIG. 2 shows a solar power station in accordance with the present invention.

Refering to FIG. 2 the focal point F is a stationary point a little above ground level allowing the focal energy collection and conversion apparatus to be stationary and on the ground. The device is mounted on a horizontal circular track to allow horizontal rotation. The primary reflector, ABCD is pivoted about the horizontal axis EG that passes through the focal point F. The secondary reflector, HJKL, also rotates about the axis EG and maintains a constant geometrical relationship with the primary reflector. Thus the whole device may rotate in a vertical plane about the axis EG. The angular motion may be determined by a conventional hydraulic system or other standard mechanical means, and may be controlled by an automatic system to track the sun. A sliding shield, S, may be provided that can move into a position between the focus F and the secondary reflector HJKL to reduce the amount of energy reaching the focus or cut it off altogether.

Second Embodiment, a Demountable Solar Cooker

Figure 3:
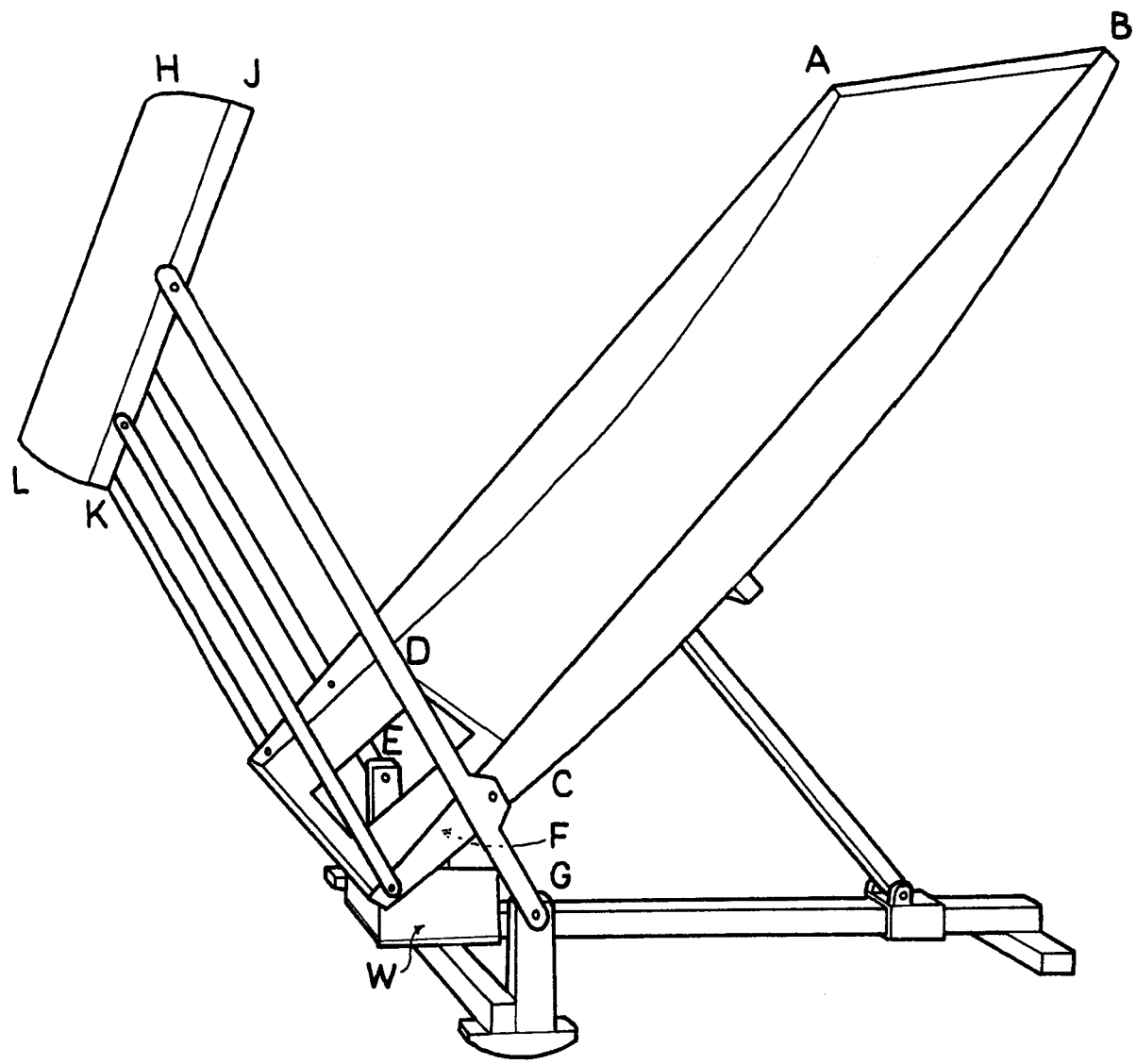
FIG. 3 shows a solar cooker in accordance with the present invention.

Refering to FIG. 3 the focal point F is a stationary point a little above ground level. The device is mounted on a horizontal framework with sliders to allow horizontal rotation. The cooking pot or chamber is also mounted on the framework at the focal point F. The secondary reflector HJKL and the primary reflector ABCD both rotate about the horizontal axis EG. When in operation the reflectors maintain a constant geometrical relationship with each other by means of a demountable structure. The angular position of the reflectors in a vertical plane about the axis EG is determined by a sliding adjustable strut or other standard mechanical device. The cooking area around the focus F may be protected by a wind shield W to reduce heat loss. When not in use the structure can be folded flat such that the secondary reflector is stored against the primary reflector thus occupying less space.

Third Embodiment, a Portable Telecommunications Transciever

Figure 4:
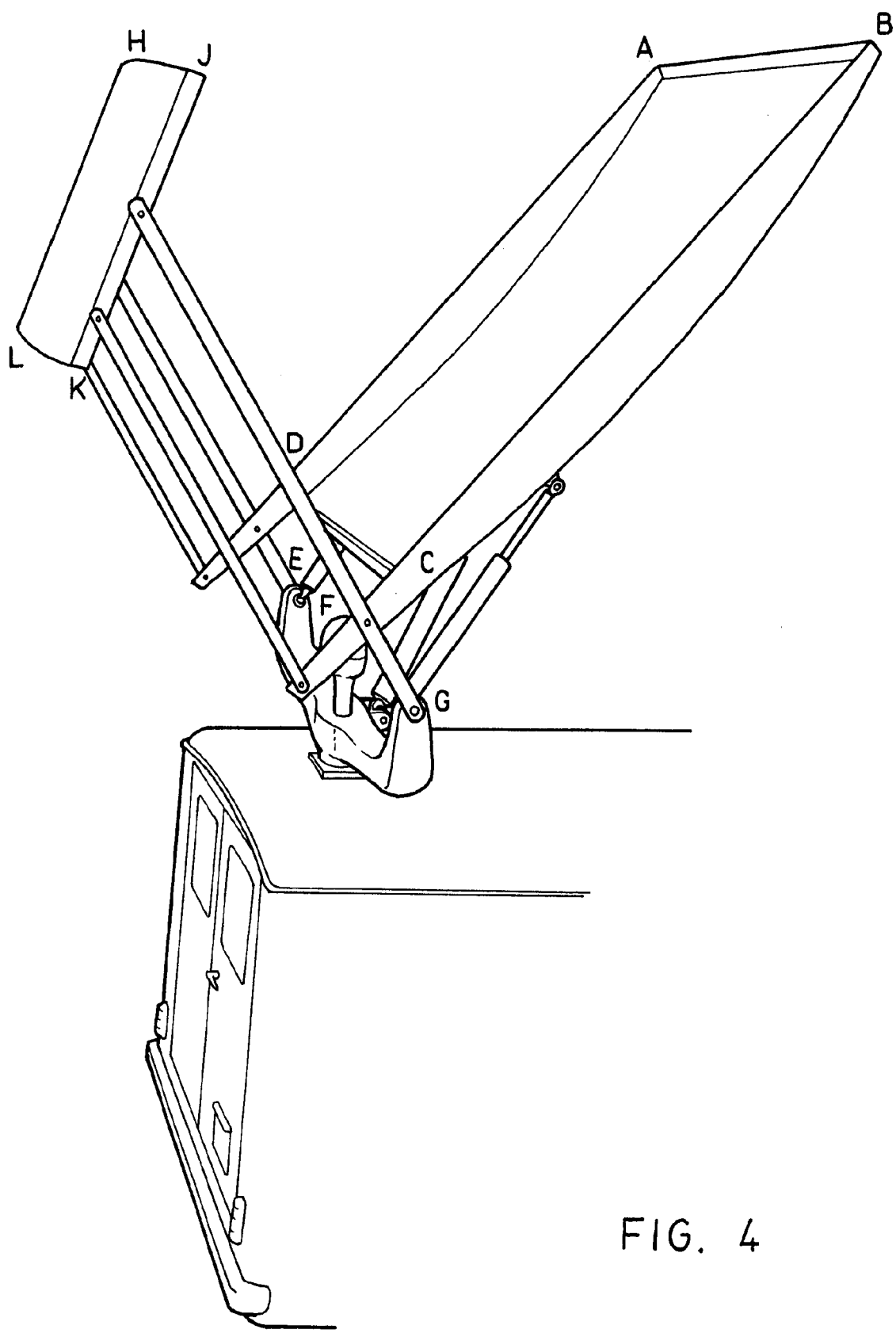
FIG. 4 shows a telecommunications transciever in accordance with the present invention.

Refering to FIG. 4, the reciever or transmitter is located at the focal point F. The device is mounted on a horizontal revolving mount. The primary reflector ABCD and the secondary reflector HJKL revolve in a vertical plane about the axis EG, that passes through the focus F, in such a way that when in operation the two reflectors maintain a constant geometrical relationship with each other by means of a demountable structure. The angular motion in the horizontal and vertical planes may be determined by hydraulic rams or other standard mechanical means. When not in use the secondary reflector can be folded against the primary reflector and if desired enclosed in a housing. This portable transciever may be mounted on the back of a lorry, the roof rack of a car, be carried by hand or any other means of transport.

I claim:

1. A device to focus to a point, or generate from a point, parallel waves, such as solar energy, comprising of two reflectors, each of which is part of a parabolic cylinder, the first reflector reflecting the waves onto the second reflector whose focal length is not greater than the first reflector's, and which is positioned so that its plane of symmetry is perpendicular to both the plane of symmetry and the focal line of the first reflector, so that the second reflector is equidistant from the second reflectors focal line and the plane parrallel to the second reflector's focal line that contains the first reflector's focal line, wherein the improvement comprises the second reflector's focal line making an acute angle to the plane of symmetry of the first reflector.

2. A device as claimed in claim 1 wherein means are provided to locate the device in the horizontal and vertical planes.

3. A device as claimed in claim 1 wherein means are provided to interrupt the incoming waves before they reach the focus to cut off or reduce the energy reaching the focus.

4. A device as claimed in claim 1 wherein means are provided to demount the support structure to take up less space when stored.

5. A device as claimed in claim 1 wherein a wind break is provided around the focal point to prevent energy loss when the device is being used to collect solar energy.

6. A device as claimed in claim 1 mounted in such a way that when the device tilts and turns the focal point remains stationary.

7. A device as claimed in claim 1 wherein means are provided to automatically track an energy source.

* * * * *

UNITED STATES PATENT AND TRADEMARK OFFICE
CERTIFICATE OF CORRECTION

| | | |
|---|---|---|
| PATENT NO. | : 4,741,610 | Page 1 of 6 |
| APPLICATION NO. | : 06/938393 | |
| DATED | : May 3, 1988 | |
| INVENTOR(S) | : Dudley | |

It is certified that error appears in the above-identified patent and that said Letters Patent is hereby corrected as shown below:

Delete Title page, and substitute new title page, therefor.

Add drawing sheets 1-4 consisting of drawing figures 1-4. (attached)

Signed and Sealed this

Twenty-second Day of June, 2010

David J. Kappos
*Director of the United States Patent and Trademark Office*

United States Patent [19]

Dudley

[11] Patent Number: 4,741,610

[45] Date of Patent: May 3, 1988

[54] OBLIQUE COMPOUND PARABOLIC REFLECTOR

[76] Inventor: Eric Dudley, 8 Victoria Road, Sidcup Kent, United Kingdom, DA15 7HD

[21] Appl. No.: 938,393

[22] Filed: Dec. 5, 1986

[51] Int. Cl.$^4$ .................. G02B 17/06; F24J 2/14; F24J 2/18

[52] U.S. Cl. .................. 350/619; 126/439; 343/912

[58] Field of Search .................. 350/619; 353/3; 126/438, 439; 343/912, 914, 915

[56] References Cited

U.S. PATENT DOCUMENTS

| | | | |
|---|---|---|---|
| 2,182,222 | 12/1939 | Courtis et al. | 126/438 |
| 2,540,417 | 2/1951 | Bergmans et al. | 350/619 |
| 3,118,437 | 1/1984 | Hunt | 350/619 |
| 4,038,972 | 8/1977 | Orrison | 126/439 |
| 4,439,020 | 3/1984 | Maruko | 353/3 |
| 4,549,528 | 10/1985 | Gibson | 126/438 |

FOREIGN PATENT DOCUMENTS 2148525  5/1985  United Kingdom ............... 350/619

*Primary Examiner*—Jon W. Henry

[57] ABSTRACT

A device to focus to a point parallel electro-magnetic or sound waves, eg a solar power station, that consists of a reflector curved in one direction to a parabola, that reflects incoming waves onto a second reflector which is also curved in one diection to a parabola. The two reflectors are so placed so as to concentrate the incoming parallel waves to a point focus. The second reflector, unlike similar devices, is so mounted that its focal line makes an acute angle to the plane of symmetry of the first reflector. The device may be mounted on a mechanism to allow the device to track the source of energy, eg in the case of a solar power station the sun. The device can be mounted so that as it tracks the source of energy the focal point remains stationary. The operation of the device can be reversed to create outgoing parallel waves of energy from a point source.

7 Claims, 4 Drawing Sheets